(12) United States Patent
Kleider et al.

(10) Patent No.: US 11,671,156 B1
(45) Date of Patent: Jun. 6, 2023

(54) ERROR CORRECTION IN A DISTRIBUTED BEAMFORMING

(71) Applicant: General Dynamics Mission Systems, Inc., Fairfax, VA (US)

(72) Inventors: John Kleider, Fairfax, VA (US); Christopher Steenhoek, Fairfax, VA (US)

(73) Assignee: General Dynamics Mission Systems, Inc.

( * ) Notice: Subject to any disclaimer, the term of this patent is extended or adjusted under 35 U.S.C. 154(b) by 0 days.

(21) Appl. No.: 17/663,731

(22) Filed: May 17, 2022

(51) Int. Cl.
*H04B 7/06* (2006.01)
(52) U.S. Cl.
CPC .................. *H04B 7/0617* (2013.01)
(58) Field of Classification Search
CPC .................................................. H04B 7/0617
USPC ........................................................ 375/267
See application file for complete search history.

(56) References Cited

U.S. PATENT DOCUMENTS

| | | | |
|---|---|---|---|
| 9,945,901 B1* | 4/2018 | Otte | H03M 1/1042 |
| 10,247,815 B1* | 4/2019 | Koubiadis | G01S 7/2813 |
| 2016/0118716 A1 | 4/2016 | Stephenne et al. | |
| 2021/0083813 A1 | 3/2021 | Wu et al. | |

* cited by examiner

*Primary Examiner* — Fitwi Y Hailegiorgis
(74) *Attorney, Agent, or Firm* — LKGlobal | Lorenz & Kopf, LLP (57) ABSTRACT

Transmitting a data signal employing a digital beamforming technique including determining a first phase offset in response to a first transmitted signal received at a first antenna and a second phase offset in response to a second transmitted signal received at the first antenna, determining a third phase offset in response to the first transmitted signal received at a second antenna and a fourth phase offset in response to the second transmitted signal received at the second antenna, generating a first correction weight in response to an average of the first phase offset and the third phase offset, generating a second correction weight in response to an average of the second phase offset and the fourth phase offset, and transmitting the first correction weight to the first transmitter and the second correction weight to the second transmitter.

20 Claims, 4 Drawing Sheets

ERROR CORRECTION IN A DISTRIBUTED BEAMFORMING

TECHNICAL FIELD

The technical field relates generally to electromagnetic and/or acoustic transmitter and receivers, and more particularly relates to methods and apparatus for providing error correction in open-loop and closed-loop distributed beamforming transmitters and receivers to achieve improved signal to noise ratio performance.

BACKGROUND

Distributed beamforming (DBF) schemes are receiving increased interest for military and commercial applications due to radio frequency spectral congestion, the possibility of system implementation in autonomous systems, reduced interference requirements to existing legacy systems and/or other co-site signals, and the desire for improvements in low probability of intercept (LPI) and low probability of detection (LPD) transmissions. DBF schemes may employ a plurality of randomly located transmitters transmitting data to a plurality of randomly located receivers.

One of the most challenging aspects of DBF schemes is to provide phase coherence between the collaborating transmit nodes and the collaborating receiver nodes as each transmitter and receiver has independent timing, phase, frequency offset and geometric position variation. For DBF to be effective, these transmitted signals must be carefully coordinated such that constructive combination of the transmitted signals at each receiver is achieved. DBF systems may be generally classified as open-loop systems, where no feedback is provided between the transmitters and receivers, and closed-loop systems, where a feedback path is provided. Closed-loop systems may include one bit feedback methods or multi-bit feedback methods. These closed-loop methods may require multiple cycles to reach convergence. For example, one-bit feedback methods may perform poorly in mobile channels due to deterministic signal perturbations and therefore may require hundreds of time slots to converge. Improved error correction may be implemented in order to increase beamforming system performance. As such, it is desirable to address these problems and provide a robust error correction solution for distributed beamforming. In addition, other desirable features and characteristics will become apparent from the subsequent summary and detailed description, and the appended claims, taken in conjunction with the accompanying drawings and this background.

SUMMARY

Disclosed herein are communications systems, communication algorithms, sensors, transmitter and receiver arrays and related control logic for provisioning communications systems, acoustic transmission and electromagnetic transmitters and receivers, methods for making and methods for operating such systems, and other systems equipped with such transmitters, receivers, and transceivers in a DBF configuration. By way of example, and not limitation, there is presented method and apparatus for providing an open-loop or closed-loop digital beamforming error correction scheme wherein a plurality of receivers generate a plurality of correction weights in response to isolated signals received from a plurality of transmitters. These correction weights may be averaged for each of the transmitters and transmitted back to the transmitters by a central receiver.

In accordance with an aspect of the present disclosure, a method for transmitting a data signal employing a digital beamforming technique including receiving, at a first antenna, a first transmitted signal from a first transmitter and a second transmitted signal from a second transmitter, determining a first phase offset in response to the first transmitted signal received at the first antenna and a second phase offset in response to the second transmitted signal received at the first antenna, receiving, at a second antenna, the first transmitted signal from the first transmitter and the second transmitted signal from the second transmitter, determining a third phase offset in response to the first transmitted signal received at the second antenna and a fourth phase offset in response to the second transmitted signal received at the second antenna, generating a first correction weight in response to an average of the first phase offset and the third phase offset, generating a second correction weight in response to an average of the second phase offset and the fourth phase offset, and transmitting the first correction weight to the first transmitter and the second correction weight to the second transmitter.

In accordance with another aspect of the present disclosure wherein further including isolating the first transmitted signal from the second transmitted signal in response to a first synchronization sequence and isolating the second transmitted signal from the first transmitted signal in response to a second synchronization sequence.

In accordance with another aspect of the present disclosure wherein the first transmitted signal includes first synchronization sequence and wherein the first synchronization sequence is a pilot symbol.

In accordance with another aspect of the present disclosure further including determining a first timing offset in response to the first transmitted signal received at the first antenna and a second timing offset in response to the first transmitted signal received at the second antenna, generating a timing correction weight in response to the first timing offset and the second timing offset and transmitting the timing correction weight to the first transmitter.

In accordance with another aspect of the present disclosure further including determining a first magnitude offset in response to the first transmitted signal received at the first antenna and a second magnitude offset in response to the first transmitted signal received at the second antenna, generating a magnitude correction weight in response to the first magnitude offset and the second magnitude offset and transmitting the magnitude correction weight to the first transmitter.

In accordance with another aspect of the present disclosure further including determining a first frequency offset in response to the first transmitted signal received at the first antenna and a second frequency offset in response to the first transmitted signal received at the second antenna, generating a frequency correction weight in response to the first frequency offset and the second frequency offset and transmitting the frequency correction weight to the first transmitter.

In another non-limiting embodiment, a beamforming communications system including a first receiver configured to receive a first transmitted signal from a first transmitter and a second transmitted signal from a second transmitter, a second receiver configured to receive the first transmitted signal from the first transmitter and the second transmitted signal from the second transmitter, a processor configured for determining a first phase offset in response to the first transmitted signal received at the first antenna and a second phase offset in response to the second transmitted signal received at the first antenna, a third phase offset in response to the first transmitted signal received at the second antenna and a fourth phase offset in response to the second transmitted signal received at the second antenna, and for generating a first correction weight in response to an average of the first phase offset and the third phase offset and generating a second correction weight in response to an average of the second phase offset and the fourth phase offset, and a central transmitter configured for transmitting the first correction weight to the first transmitter and the second correction weight to the second transmitter.

In another non-limiting embodiment, a method of transmitting a data signal including transmitting, by a first transmitter, a first signal including a first joint synchronization-channel sequence to a first receiver and a second receiver, generating a first correction weight in response to a first phase offset of the first signal at the first receiver, generating, a second correction weight in response to a second phase offset of the first signal at the second receiver, generating an average correction weight in response to the first correction weight and the second correction weight, and transmitting, by a feedback transmitter, the average correction weight to the first transmitter.

Other objects, advantages and novel features of the exemplary embodiments will become more apparent from the following detailed description of exemplary embodiments and the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description. Various non-limiting embodiments of communications systems, communication system algorithms, and software are provided. In general, the disclosure herein describes a communications system employing distributed beamforming (DBF) with novel error correction to provide improved signal-to-noise ratio (SNR) that affords, but is not limited to, range extension, lower transmit power, higher throughput, LPI/LPD signaling, interference mitigation, and spatial selectivity. The novel error connection technique may also apply to distributed Acoustic sonar systems and to distributed radar systems. In some exemplary embodiments, the distributed transmitters may be monostatic in that transmitters are co-located with the receivers or bi-static where the transmitters and receivers are not co-located.

Figure 1:
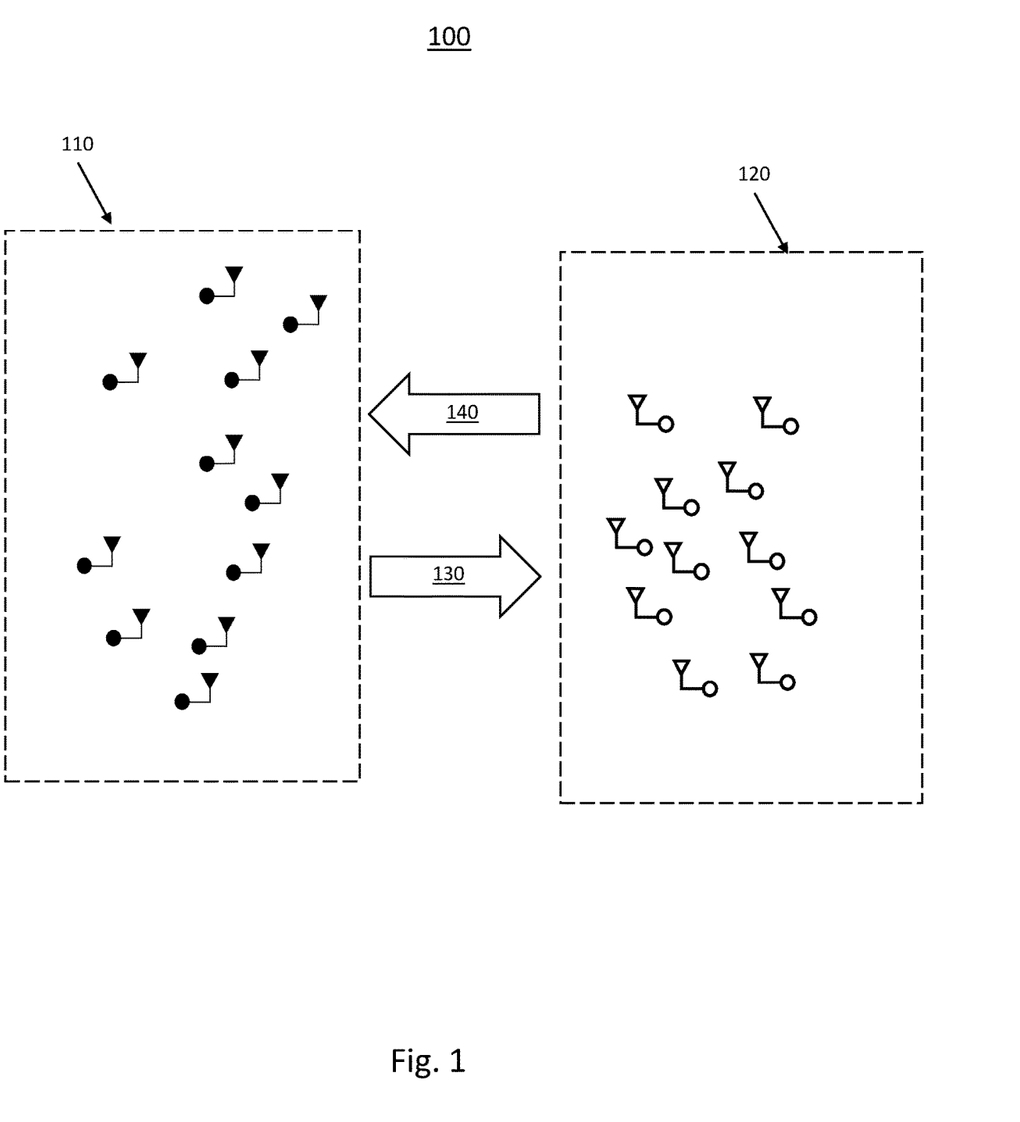
FIG. 1 illustrates an environment for implementing a scalable DBF error correction system according to an exemplary embodiment of the present disclosure.

Turning now to FIG. 1, an environment 100 for a system for implementing a scalable DBF error correction system according to an exemplary embodiment of the present disclosure is shown. The exemplary environment includes a plurality of transmitters 110 configured to transmit data to a plurality of receivers 120. The plurality of transmitters 110 and plurality of receives 120 may be randomly positioned within the environment 100.

In some exemplary DBF communications systems each of a plurality of transmitters 110 may cooperate as a virtual transmit antenna array to form a transmit beam (signal) 130 toward a plurality of receivers 120. Each of the plurality of transmitters 110 may be an omni-directional transmitter or employ an antenna with some gain directed in the general direction of the plurality of receivers 120. Similarly, a plurality of receivers 120 may cooperate as a virtual receive antenna array to form a feedback beam (signal) 140 toward a plurality of transmitters 110. Each of the plurality of receivers 120 may be an omni-directional receiver or employ an antenna with some gain directed in the general direction of the plurality of transmitters 110. Being independent radios, each of the plurality of transmitters 110 and each of the plurality of receivers 120 may experience independent timing, frequency, and phase offsets in their on-board oscillators. Furthermore, the distributed antenna elements of the virtual transmit antenna array and the distributed antenna elements of the virtual receive antenna array may also experience non-ideal alignment, especially if node elements are mobile, even when precise formation controllers are utilized. Note that the exemplary DBF communications system is general in that it can also apply to a distributed array of sub-arrays where each of the antennas of the transmitters or the receivers or both the transmitters and receivers are an array of antenna elements. The plurality of transmitters 110 may or may not be coordinated by a central transmitter and the plurality of receivers 120 may or may not be coordinated by a central receiver.

The DBF communications system employs methods which enable each of the plurality of receivers 120 to separate the individual transmit signals of each of the plurality of transmitters 110. Each of the plurality of receivers 120 may then, using transmitted synchronization signals, estimate and correct carrier-timing, -frequency, and -phase offsets, as well as amplitude and phase perturbations caused by the wireless channel, of each transmitted signal and coherently sum the corrected transmit signals to reproduce the transmit beam 130 despite the independent offsets and non-ideal alignment of the virtual transmit array. This provides an N times gain in SNR where N is the number of transmitters cooperating as a virtual antenna array. Subsequently, the received beams at each cooperating receiver of the plurality of receivers 120 may be provided to a central DBF receiver where the received beams may be phase aligned and coherently summed to provide an N*M gain in SNR, where M is the number of receivers cooperating as a virtual antenna array.

In a closed-loop DBF system, a feedback channel may be employed such that the carrier-timing, -frequency, and magnitude and phase, as well as amplitude and phase perturbations caused by the wireless channel, correction estimates determined by each of the plurality of receivers 120 for each of the plurality of transmitters 110 may be sent back to the respective transmitters via the feedback beam 140. When a plurality of receivers 120 are collaborating, each receiver will produce timing, frequency, and magnitude and phase correction estimates for each of the collaborating transmitters 110. These correction estimates may be averaged by a central DBF receiver to provide improved feedback to the transmitters. Upon receiving correction estimates, the respective transmitter may then adjust the transmitted signal in order to maximize the SNR experienced by the receivers. The DBF system may achieve a closed-loop SNR gain of $N^2*M$. When no feedback channel is employed, the system is considered open-loop and achieves the $N*M$ gain in SNR.

A DBF communications system may operate with a single receiver and a plurality of cooperating transmitters. In this DBF system the transmitters may cooperate as a virtual antenna array to form a beam toward a single receiver. The single receiver may then estimate and correct the carrier-timing, -frequency, magnitude differences and phase offsets, as well as amplitude and phase perturbations caused by the wireless channel, of each transmitted signal and coherently sum the corrected transmit signals to reproduce the transmit beam to produce an N times gain in SNR at the receiver in open-loop. If a feedback channel is employed the receiver may send back the correction estimates to the respective transmitters. Upon receiving correction estimates, the respective transmitter may then adjust the transmitted signal in order to maximize the SNR experienced by the receiver. The single receiver DBF system may achieve a closed-loop SNR gain of $N^2$.

A DBF communications system may operate with a single transmitter and a plurality of cooperating receivers. In this DBF system the receivers may cooperate as a virtual antenna array to form a beam toward a single transmitter. The plurality of receivers will receive the single transmit signal, estimate and corrects the carrier-timing, -frequency, magnitude differences and phase offsets, as well as amplitude and phase perturbations caused by the wireless channel. Subsequently, the received signal at each cooperating receiver may be provided to a central DBF receiver where they may be magnitude and phase aligned and coherently summed to provide an open-loop SNR gain of M, where M is the number of receivers cooperating as a virtual antenna array A closed-loop DBF communication system may feed back correction estimates to the transmit virtual antenna array to achieve maximum theoretical beamforming gain in a single step which supports higher mobility than multi-step feedback systems. Multi-step feedback systems, which can take up to 100's or 1000's of feedback steps before SNR-gain is maximized, may suffer from beamforming gain degradation due continuous geometric variation experienced by an array of mobile nodes. When feedback is utilized to maximize the received SNR, the channel is constantly changing and the feedback corrections may become stale and erroneous due to both receiver estimation error and channel decorrelation between DBF-Rx correction weight estimation output time and the time at which the corrections are applied to the DBF-Tx system. Single step feedback enables lower latency between correction updates and, therefore, minimizes error in the beamforming correction weights. With single-step feedback, the DBF system may be tuned to the mobility of the system with higher or lower rates of feedback. In some exemplary embodiments, predictive methods may be utilized such that estimates of the change in correction weights may be applied based on the prediction of how the weights will change if excess delay exists between determination of the corrections weights and when the weights are applied at the transmitter. Machine learning may be used to aid in the prediction of correction weights for highly dynamic channels.

Figure 2:
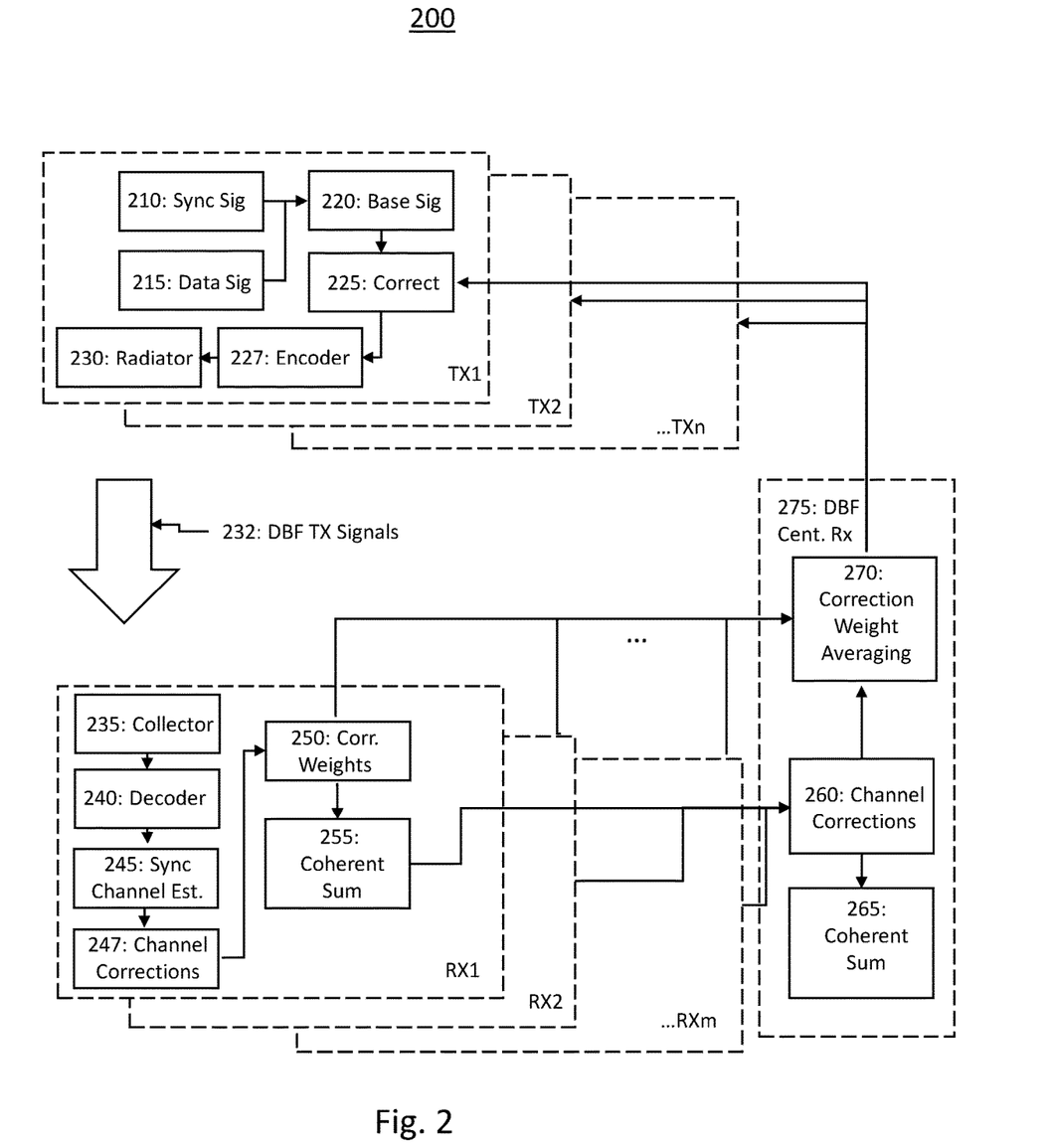
FIG. 2 illustrates a system for transmitting and receiving a DBF signal with error correction according to an exemplary embodiment.

Turning now to FIG. 2, a system 200 for transmitting and receiving a DBF signal with error correction according to an exemplary embodiment is shown. In this exemplary system 200, there are n different elements collaborating in the DBF-Tx system TX1, TX2 . . . TXn, while m different elements collaborate in the DBF-Rx System RX1, RX2 . . . RXm. The exemplary system 200 employs a synchronization-channel estimation sequence 210 applied at each of the n transmitters TX1, TX2 . . . TXn. A synchronization-channel estimation sequence 210 is utilized by each of the m receivers to enable estimation and removal of any synchronization or channel differences. The synchronization-channel estimation sequence 210 should be one such that timing-, frequency-, and phase-offsets can be determined for each individual transmitter signal. The synchronization-channel estimation sequence 210 may include signal parts that enable magnitude and phase channel differences between each individual transmitter element and each individual receiver antenna element, such that these differences can be estimated and corrected. In some embodiments, channel estimation may be performed by inserting cell-specific reference signals, such as pilot symbols, at assigned positions in both time and frequency. These pilot symbols may be used to provide a reliable estimate of the complex gains of the propagation channel in order to improve the communications system performance in terms of bit error rate and thereby increasing the capacity of the communications system, such as an OFDMA system. In some exemplary embodiments, the synchronization signal 210 may be a sync word, sync character, sync sequence or sync preamble used to synchronize a data transmission by indicating the end of header information and the start of the data signal 215. This synchronization signal 210 may be used to time-align a received signal with local references, such as a data clock and/or demodulator waveforms.

A first of the exemplary transmitters TX1 is configured to generate a baseband signal 220 in response to the synchronization sequence 210 and a data signal 215. The baseband signal 220 may be encoded using CDMA channel access method or any multiple access method. If received, a correction weight 225 may be applied to the baseband signal 220 to generate weighted baseband signal. The correction weights 225 may be received from the DBF receiver system to compensate for magnitude and/or phase errors. The baseband signal may then be encoded 227 and the encoded baseband signal then be coupled to a radiator 230 for transmission to the plurality of receivers RX1, RX2, . . . RXn. In some exemplary embodiments, the encoded baseband signal may transmitted from the DBF transmitter via an omnidirectional or directional antenna in a general direction of the intended receivers. Alternatively, the encoded baseband signal may be combined with other transmitted signals and transmitted via a wired or fiber optic transmission channel.

In some example embodiments, the baseband signal 220 with magnitude and/or phase error correction weights 225 applied is modulated with appropriate radio frequency carrier signals and the desired carrier frequencies. The encoded baseband signal is then coupled to the radiator 230 and transmitted to the plurality of receivers RX1, RX2, . . . RXm as a transmitted signal 232. In some exemplary embodiments, correction weights 225 may be magnitude and phase-dependent correction weights per transmitter, which may be frequency dependent for frequency-selective channels and time-dependent for time-selective channels and a combination thereof. The correction weights may be used to adjust coarse and fine timing-, sampling, frequency- and/or phase-offsets, as well as amplitude and phase perturbations caused by the wireless channel.

Each of the DBF receivers RX1, RX2, RXm are configured to receive a transmitted signal 232 from each of the transmitters TX1, TX2, TXn by employing one or more collectors 235. Each of the transmitted signals includes the synchronization signal allowing for the transmitted signals from each of the DBF transmitters to be identified and isolated. Channel noise and/or time-selective and/or frequency-selective fading may be present in the received signal in addition to the transmitted signals 232. Channel fading could be due to time-, frequency- and/or spatial-variations in the channel over the signal transmission intervals. The collector 235 may include an antenna as well as circuitry to amplify, filter and demodulate the transmitted signals 232 to recover the coded distributed signal.

A decoder 240 is employed to decode the coded distributed signal received from the collector 235. The decoder 240 may receive correction weights and/or offset values determined in response to previously received transmit signals.

Even if each transmitter TX1, TX2 . . . TXn is equipped with GPS-discipline oscillators, each transmitter TX1, TX2 . . . TXn will still experience synchronization offsets relative to one another. In a completely wireless DBF, common timing and oscillator references are not available between the individual nodes. Distributed antenna elements will also experience non-ideal alignment, especially when each node element is mobile, even when precise formation controllers are utilized. To address these issues, the exemplary receiver RX1 is configured to perform the sync channel estimation 245 to determine the phase, frequency, and magnitude offsets for each of the received signals. In some exemplary embodiments, timing and frequency synchronization and channel estimation may be performed on each of the transmit signals by the received signal sync and channel estimation block 245 and the subsequently received transmit signals are magnitude corrected and phase aligned by the Tx magnitude and/or phase correction offsets by the channel corrections block 247, to enable a coherent sum 255. The Tx magnitude and/or phase correction offsets may be determined for the received signal by the received signal sync and channel estimation block 245 and coupled, with Tx magnitude and/or phase correction offsets from other receivers (RX2 . . . RXn) to a DBF central receiver 275 generate magnitude and/or phase correction weight averages 270 which is transmitted back to the transmitters TX1, TX2, . . . TXn.

In some exemplary embodiments, the magnitude and/or phase error correction weights 250 determined at each of the DBF receivers RX1, RX2, RXm may be relayed back to each DBF transmitter TX1, TX2, . . . TXn if a feedback channel is available. The magnitude and/or phase error correction weights 250 may include any residual synchronization corrections and channel corrections necessary to ensure coherency of the transmit signals to create a coherent beam. The magnitude and/or phase error correction weights 250 may also be used to maximize the global SNR across all DBF receiver elements. For closed-loop operation, the correction weights 250 may be fed back in a single-step, which enables the system to operate in mobile channels. For close-loop operation, the SNR is maximized by coherently aligning the individual DBF transmit signals in the far-field radiated signal. In some exemplary embodiments, error terms are acquired, estimated and averaged at each of the receivers RX1, RX2, . . . RXm. This may involve a bank of synchronizers and maximum likelihood estimators, such as a bank of correlators, the number of which for each receiver is equal to the number of transmitters, N.

In some embodiments, the Tx frequency and timing offsets determined by the received signal sync and channel estimation block 245 and the magnitude and phase corrections 250 may be coupled to a correction weight averaging processor 270 within a DBF central receiver 275 along with the correction weights calculated by the other receivers. The averaged correction weights may then be sent from the DBF central receiver 275 to the DBF transmitters TX1, TX2 . . . TXn and may include sampling offset, frequency offset and/or clock offset corrections for each DBF transmitter TX1, TX2 . . . TXn. The DBF central receiver 270 may then be configured to use M-maximum likelihood estimators to combine each of the receiver estimates to further improve the estimate by a factor of M. Additionally, the DBF central receiver 270 may direct one or more transmitters to turn off distributed coding to the data stream if sufficient coherent gains are realized. For example, a weight vector could be a set of simple complex weights, the size of which is the number of antennas and/or RF chains or simple a vector of all 1's applied to the data and/or the synchronization channel estimation signal. In some exemplary embodiments, in addition to an all 1's vector, distributed coding is performed over a space-time block and may be turned such that no space-time block coding is performed on the data.

Finally, the DBF central receiver 270 may include a channel correction processor 260 configured to magnitude correct and phase align each of the received signals from each of the plurality of receivers RX1, RX2 . . . RXn in response to magnitude and/or phase correction weights to compensate for receiver magnitude, phase, frequency and timing offsets. These corrected received signals are then coherently summed 280 to extract the transmitted baseband signal. When the timing offset is greater than a single sample, the timing may be aligned using a sample delay operation rather than a phase adjustment. However, if the timing offset is too large and only phase adjustments are made, an amplitude loss may occur. The system may be configured to first adjust for coarse sample timing offsets using a sample delay block, and then, one the timing is aligned, to use phase to adjust for residual timing offsets.

Figure 3:
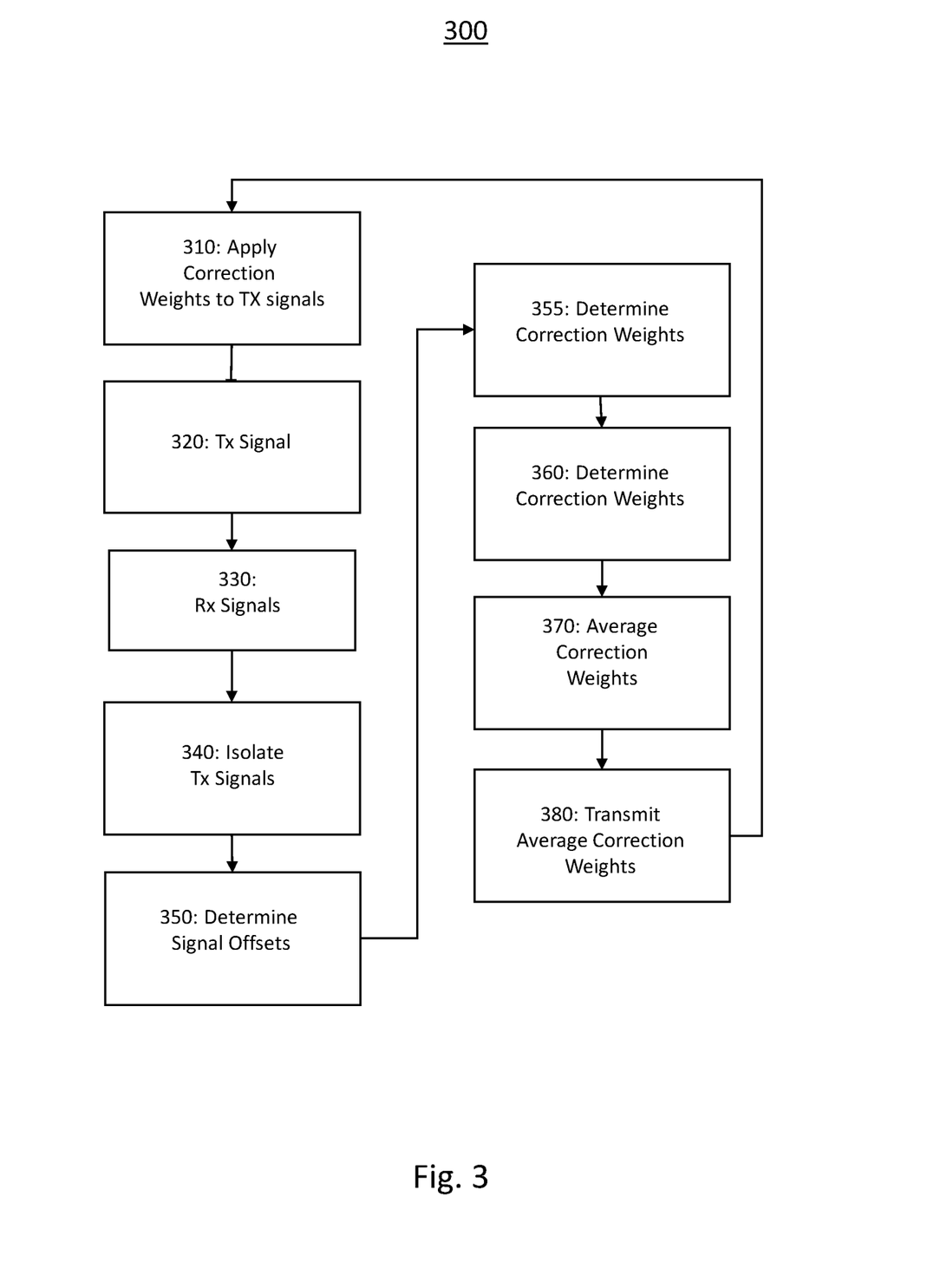
FIG. 3 shows a flow diagram illustrating a non-limiting embodiment of a method implementing an error correction algorithm in a DBF communications system according to an exemplary embodiment of the present disclosure.

Turning now to FIG. 3, a flow diagram illustrating a non-limiting embodiment of a method 300 implementing an error correction algorithm in a DBF communications system according to an exemplary embodiment of the present disclosure is shown. The exemplary method 300 is first configured to apply 310 correction weights to a baseband signal to generate a transmit signal to be coupled to a radiator. If correction weights are not available, a transmit signal may be generated in response to the unweighted baseband signal. The baseband signal includes a synchronization-channel estimation sequence which allows the transmit signal to be isolated at a receiver such that timing-, frequency-, and phase-offsets can be determined for each individual transmitter signal. The transmit signal forms part of a DBF communications system. In some exemplary embodiments, the transmitted signal is not restricted to baseband signals. The radiated signal may use any circuitry and/or technique commonly used to translate the radiated signal to RF or acoustic signals in either air or water.

The method next transmits 320 the weighted transmit signal via the radiator to the various receivers within the DBF communications system. The method is next configured to receive 330 a plurality of transmit signals from a plurality of transmitters at a collector coupled to one or more DBF receivers. The received signals may include channel noise and/or time-selective and/or frequency-selective fading introduced during transmission of the signals in addition to the original transmitted signals. In some exemplary embodiments, weights may still be applied without distributed coding. In this case distributed coding is only applied to the joint sync-channel estimation sequence, which is transmitted periodically. Distributed coding is not applied to the data signal, if it was, then only a NM gain is possible on the data. In any system, it is desired to have N*N*M gain which is not possible if distributed coding is applied to the data.

The receiver is configured to isolate 340 each of the transmitted signals from the received signals using the synchronization-channel estimation sequence. The receiver next determines 350 signal offsets for teach of the isolated transit signals. The signal offsets may include magnitude, frequency, phase and timing offsets. In some exemplary embodiments, these signal offsets may be used by the receiver to align subsequently received and isolated signals at the receiver. The receiver may next determine 355 correction weights in response to these offsets. In addition, the receiver may next generate 360 a correction weight for each of the offsets for each of the isolated transmit signals. These correction weights may then be coupled to a central receiver, or other system processor, for calculation 370 of average correction weights. The average correction weights are calculated in response to a plurality of correction weights received from a plurality of DBF receivers. Each of the plurality of DBF receivers will receive a version of each of the transmit signals from each of the transmitters within the DBF communications system.

The average correction weights are next transmitted 380 to each of the transmitters within the DBF communications system. The transmitters the apply 310 the corresponding average correction weight to subsequent transmit signals in order to reduce or eliminate the magnitude, frequency, phase and timing offsets realized at the DBF receivers.

Figure 4:
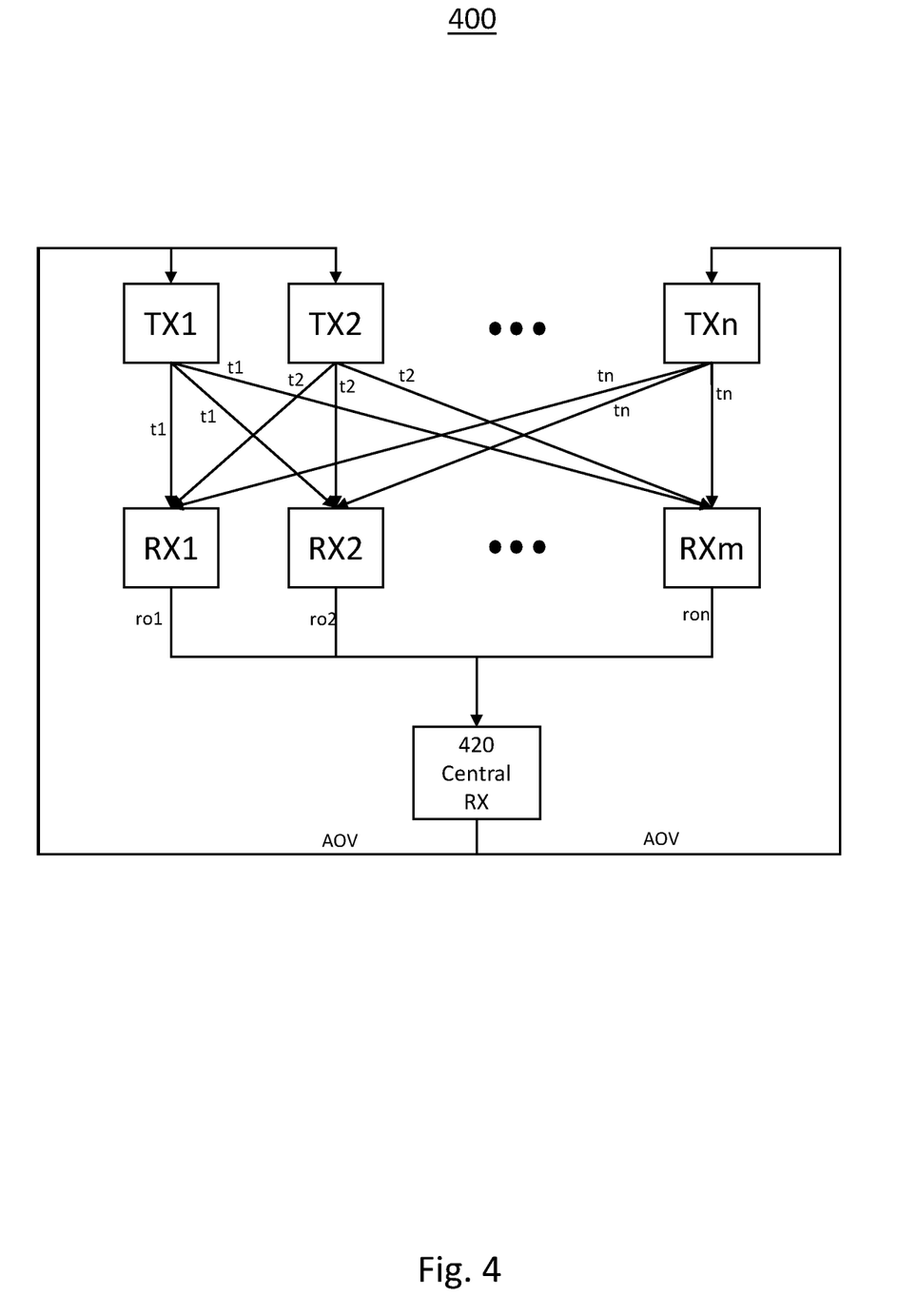
FIG. 4 illustrates an exemplary system for transmitting and receiving a DBF signal with error correction according to an exemplary embodiment.

Turning now to FIG. 4, an exemplary system 400 for transmitting and receiving a DBF signal with error correction according to an exemplary embodiment is shown. The exemplary system 400 includes a first plurality of DBF transmitters TX1, TX2, . . . TXn and a first plurality of DBF receivers RX1, RX2, . . . RXm. Each of the plurality of DBF transmitters TX1, TX2, . . . TXn is configured to transmit a transmitted signal t1, t2, . . . tn having a synchronization sequence portion and a data portion. The synchronization sequence allowing for each of the transmitted signals t1, t2, . . . tn from each of the DBF transmitters TX1, TX2, . . . TXn to be identified and isolated by each of the DBF receivers RX1, RX2, . . . RXm.

Each of the plurality of DBF receivers RX1, RX2, . . . RXm is configured to receive a version of each of the transmitted signals t1, t2, . . . tn. Each of the versions of each of the transmitted signals will include slight variations due to propagation time and distance, weather, multipath, noise, weather conditions, and the like. Thus, each of the transmitted signals t1, t2, . . . tn received at the DBF receivers will include channel noise and/or time-selective and/or frequency-selective fading in addition to the original transmitted signals t1, t2, . . . tn. Channel fading could be due to time-, frequency- and/or spatial-variations in the channel over the signal transmission intervals.

The DBF receivers RX1, RX2, . . . RXm are further configured to isolate each of the transmitted signals t1, t2, . . . tn using the joint synchronization-channel estimation sequence portion of the signal and distributed decoding, if coding is present on the transmitted signals. The DBF receivers RX1, RX2, . . . RXm next determine various offsets for teach of the isolated transmitted signals t1, t2, . . . tn. These offsets may include frequency-, phase-, magnitude and timing offsets. The receivers RX1, RX2, . . . RXm then couple the offsets to the central receiver 420. In some exemplary embodiments, the receivers RX1, RX2, . . . RXm may average each of the offsets for each of the transmitted signals t1, t2, . . . tn for a plurality of time intervals and couple the averaged offsets central receiver 420. For example, a receiver RX1 may determine a frequency offset, magnitude offset, phase offset and timing offset for the transmitted signal t1 from transmitter TX1 at five, one second intervals. These five sets of offset values may then be averaged and the five average offset values will be coupled to the central receiver 420. In some exemplary embodiments, the DBF receivers RX1, RX2, . . . RXm may determine a correction weight for each of the transmitters TX1, TX2, . . . TXn in response to the determined offset values and couple these correction weights to the central receiver 420.

In some exemplary embodiments, the central receiver 420 is configured to receive a plurality of offset values ro1, ro2, . . . ron, for each of the transmitters TX1, TX2, . . . TXn from each of the DBF receivers RX1, RX2, . . . RXm. The central receiver 420 next generates an average offset value AOV for each of the transmitters TX1, TX2, . . . TXn in response to the plurality of offset values. The average offset values AOV are then transmitted from the central receiver 420 to each of the transmitters TX1, TX2, . . . TXn. In some exemplary embodiments, correction weights for each of the transmitters TX1, TX2, . . . TXn may be determined by the central receiver 420 in response to the average offset values. Alternatively, if correction weights are received from each of the receivers RX1, RX2, . . . RXm by the central receiver 420, the central receiver 420 may determine an average correction weight for each of the transmitters TX1, TX2, . . . TXn.

In some exemplary embodiments, each receiver RX1, RX2, . . . RXm may determines the corrections weights it sees for each of the transmitter TX1, TX2, . . . TXn. Each respective receiver RX1, RX2, . . . RXm may also performs a coherent sum of all transmitter signals. The master receiver may then performs a coherent sum of all shared coherent signals from each receiver RX1, RX2, . . . RXm which may all have a different carrier phase due to individual receiver position errors. The master receiver's coherent sum may also have a carrier phase shift due to the master receiver's position. The master receiver may then disseminate this carrier phase to all the other receivers RX1, RX2, . . . RXm. The other receivers RX1, RX2, . . . RXm may then compute a phase shift of their own carrier phase with respect to the master receiver phase. Each receiver phase shift is then used on subsequent receptions to correct for receiver position errors. This may be continuously performed when either the distributed transmitters and/or distributed receivers are mobile thereby self correcting for position errors on both the transmitter and receiver ends.

The transmitters TX1, TX2, . . . TXn are configured to receive the average offset values AOV from the central receiver 420 and to weight the subsequent transmitted signals t1, t2 . . . tn in response to the average offset values AOV. In some exemplary embodiments, each of the plurality of transmitters TX1, TX2, . . . TXn will receive the average offset values AOV for every transmitter TX1, TX2, . . . TXn and will extract the average offset value AOV corresponding to the individual transmitter TX1, TX2, . . . TXn. For example, the first transmitter TX1 will receive the average offset values for all the transmitters TX1, TX2, . . . TXn, and will extract the average offset value AOV corresponding to the first transmitted signal t1. The first transmitter TX1 will then weight subsequent transmissions of the first transmitted signal t1 with the average offset value AOV corresponding to the first transmitted signal t1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those of ordinary skill in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

As used herein, the term processor refers to any hardware, software embodied in a medium, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that perform the described algorithms.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowcharts described herein. The software components and/or functionality may be located on a single computer or distributed across multiple computers.

What is claimed is:

1. A method for transmitting a data signal employing a digital beamforming technique comprising:
   receiving, at a first antenna, a first transmitted signal from a first transmitter and a second transmitted signal from a second transmitter;
   determining a first phase offset in response to the first transmitted signal received at the first antenna and a second phase offset in response to the second transmitted signal received at the first antenna;
   receiving, at a second antenna, the first transmitted signal from the first transmitter and the second transmitted signal from the second transmitter;
   determining a third phase offset in response to the first transmitted signal received at the second antenna and a fourth phase offset in response to the second transmitted signal received at the second antenna;
   generating a first correction weight in response to an average of the first phase offset and the third phase offset;
   generating a second correction weight in response to an average of the second phase offset and the fourth phase offset; and
   transmitting the first correction weight to the first transmitter and the second correction weight to the second transmitter.

2. The method of claim 1 further including isolating the first transmitted signal from the second transmitted signal in response to a first synchronization sequence and isolating the second transmitted signal from the first transmitted signal in response to a second synchronization sequence.

3. The method of claim 1 wherein the first transmitted signal includes a first synchronization sequence and wherein the first synchronization sequence is a pilot symbol.

4. The method of claim 1 further including determining a first timing offset in response to the first transmitted signal received at the first antenna and a second timing offset in response to the first transmitted signal received at the second antenna, generating a timing correction weight in response to the first timing offset and the second timing offset and transmitting the timing correction weight to the first transmitter.

5. The method of claim 1 further including determining a first magnitude offset in response to the first transmitted signal received at the first antenna and a second magnitude offset in response to the first transmitted signal received at the second antenna, generating a magnitude correction weight in response to the first magnitude offset and the second magnitude offset and transmitting the magnitude correction weight to the first transmitter.

6. The method of claim 1 including determining a first frequency offset in response to the first transmitted signal received at the first antenna and a second frequency offset in response to the first transmitted signal received at the second antenna, generating a frequency correction weight in response to the first frequency offset and the second frequency offset and transmitting the frequency correction weight to the first transmitter.

7. The method of claim 1, wherein the first correction weigh and the second correction weight are determined by a central receiver in response to the first phase offset and the second phase offset determined by a first beamforming receiver and the third phase offset and the fourth phase offset determined by a second beamforming receiver.

8. A beamforming communications system comprising:
   a first receiver configured to receive a first transmitted signal from a first transmitter and a second transmitted signal from a second transmitter;
   a second receiver configured to receive the first transmitted signal from the first transmitter and the second transmitted signal from the second transmitter;
   a processor configured for determining a first phase offset in response to the first transmitted signal received at the first antenna and a second phase offset in response to the second transmitted signal received at the first antenna, a third phase offset in response to the first transmitted signal received at the second antenna and a fourth phase offset in response to the second transmitted signal received at the second antenna, and for generating a first correction weight in response to an average of the first phase offset and the third phase offset and generating a second correction weight in response to an average of the second phase offset and the fourth phase offset; and a central transmitter configured for transmitting the first correction weight to the first transmitter and the second correction weight to the second transmitter.

9. The beamforming communications system of claim 8, wherein the first receiver is further configured for isolating the first transmitted signal from the second transmitted signal in response to a first joint synchronization-channel sequence and isolating the second transmitted signal from the first transmitted signal in response to a second joint synchronization-channel sequence.

10. The beamforming communications system of claim 8, wherein the first transmitted signal includes a first joint synchronization-channel sequence and wherein the first synchronization sequence is a pilot symbol.

11. The beamforming communications system of claim 8, wherein the processor is further configured for determining a first timing offset in response to the first transmitted signal received at the first antenna and a second timing offset in response to the first transmitted signal received at the second antenna, generating a timing correction weight in response to the first timing offset and the second timing offset and transmitting the timing correction weight to the first transmitter.

12. The beamforming communications system of claim 8, wherein the processor is further configured for determining a first magnitude offset in response to the first transmitted signal received at the first antenna and a second magnitude offset in response to the first transmitted signal received at the second antenna, generating a magnitude correction weight in response to the first magnitude offset and the second magnitude offset and transmitting the magnitude correction weight to the first transmitter.

13. The beamforming communications system of claim 8, wherein the processor is further configured for determining a first frequency offset in response to the first transmitted signal received at the first antenna and a second frequency offset in response to the first transmitted signal received at the second antenna, generating a frequency correction weight in response to the first frequency offset and the second frequency offset and transmitting the frequency correction weight to the first transmitter.

14. The beamforming communications system of claim 8, wherein the processor forms part of a central receiver communicatively coupled to the first receiver and the second receiver.

15. A method of transmitting a data comprising:

transmitting, by a first transmitter, a first signal including a first joint synchronization-channel sequence to a first receiver and a second receiver;

generating a first correction weight in response to a first phase offset of the first signal at the first receiver;

generating, a second correction weight in response to a second phase offset of the first signal at the second receiver;

generating an average correction weight in response to the first correction weight and the second correction weight; and transmitting, by a feedback transmitter, the average correction weight to the first transmitter.

16. The method of claim 15 wherein the first transmitter is further configured to generate a phase adjusted transmission signal in response to the average correction weight.

17. The method of claim 15, wherein the first receiver is configured to isolate the first signal in response to the first joint synchronization-channel sequence and a distributed decoding.

18. The method of claim 15 wherein the first joint synchronization-channel sequence is a pilot signal.

19. The method of claim 18, wherein the first receiver is further configured for generating a third correction weight in response to at least one of a first frequency offset of the first signal, a first magnitude offset of the first signal and a first timing offset of the first signal.

20. The method of claim 19, wherein the first receiver and the second receiver form part of a digital beamforming system.

* * * * *